US007355366B2

(12) United States Patent
Kim

(10) Patent No.: US 7,355,366 B2
(45) Date of Patent: Apr. 8, 2008

(54) CHARGING SYSTEM AND METHOD FOR CHARGING A COMMUNICATION TERMINAL

(75) Inventor: Sang Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 10/739,188

(22) Filed: Dec. 19, 2003

(65) Prior Publication Data

US 2004/0130295 A1   Jul. 8, 2004

(30) Foreign Application Priority Data

Dec. 21, 2002  (KR) ...................... 10-2002-0082129

(51) Int. Cl.
   *H01M 10/44*  (2006.01)
   *H01M 10/46*  (2006.01)
(52) U.S. Cl. ...................................... 320/128
(58) Field of Classification Search ................ 320/125, 320/128, 135, 137, 160
   See application file for complete search history.

(56) References Cited

U.S. PATENT DOCUMENTS 5,150,031 A    9/1992  James et al.
5,382,893 A *  1/1995  Dehnel ........................ 320/160
5,486,749 A *  1/1996  Brainard ..................... 320/125

FOREIGN PATENT DOCUMENTS

| JP | 03-3140 | 1/1991 |
| JP | 05-11745 | 2/1993 |
| JP | 9037483 | 2/1997 |
| JP | 11-206034 | 7/1999 |
| KR | 1998-82962 | 5/1998 |

OTHER PUBLICATIONS

Chinese Office Action and English Translation, no date.

* cited by examiner

*Primary Examiner*—Edward H Tso
(74) *Attorney, Agent, or Firm*—Ked & Associates, LLP

(57) ABSTRACT

A charging system and method for charging a communication terminal are provided which supply to a battery a compensation current equivalent to an amount of current input to a communication terminal. The charging method includes detecting a value of current flowing to a communication terminal when a battery attached to the communication terminal is being charged by a charging device, outputting to the charging device a data signal corresponding to the detected current value, and adding a compensation current to the current input to the battery based on the detected current value. Regardless of an operation of the communication terminal, a constant current is supplied to the battery being charged, and thus, time taken for completing charging of the battery can be reduced.

28 Claims, 3 Drawing Sheets

CHARGING SYSTEM AND METHOD FOR CHARGING A COMMUNICATION TERMINAL

BACKGROUND OF THE INVENTION

1. Field of the Invention

The invention relates to a charging system and method for charging a communication terminal, such as a mobile communication terminal.

2. Background of the Related Art

In general, a battery for a mobile communication terminal includes three or four terminals that connect to a charger. If the battery includes three terminals, they are generally a (+) terminal, a (−) terminal, and an ID terminal. If the battery includes four terminals, a temperature checking terminal for checking temperature change of the battery is also included.

The ID terminal checks a capacity of the charged battery. The battery capacity can be determined from a resistance connected to the ID terminal. The value of the resistance is generally determined by the manufacturer. Because a resistance is generally provided between the ID terminal and the (−) terminal of the battery, a charger can determine a battery capacity by checking the resistance between the two terminals.

The charger is used to charge a battery attached to a mobile communication terminal. For example, a home charger or a travel charger receives AC power and converts it to DC power to generate a constant voltage, for example, 4.2V. On the other hand, a car-use charger or hands-free kit (HFK) reduces DC power, for example, 12V, a voltage for cars, to generate a constant voltage, for example, 4.2V, to perform the charging operation.

For the charger, a constant voltage/constant current circuit is used to provide a DC current for charging. If the battery receives only a low voltage for charging, charging is performed with the constant current. If the battery voltage goes up, charging is performed with the constant voltage. As charging is continuously performed, the charging current is gradually reduced.

A resistor provides resistance between the ID terminal and the (−) terminal of the battery, and is connected in series therewith, such that the current flows through the resistor. The charger measures the voltages at both ends of the resistor. If they are higher than a predetermined level, the charger determines that the battery has not been fully charged. However, if they are the same as, or lower than, the predetermined level, the charger determines that the battery has been fully charged.

FIG. 1 is a flow chart of a conventional art battery charging method for a mobile communication terminal.

As shown in FIG. 1, the conventional art battery charging method includes: checking an ID resistance value of a battery by verifying the battery capacity, step S110, applying a charging current corresponding to the battery capacity, step S120, checking a charging voltage or charging current input to the battery, step S130, determining whether battery charging has been completed, step S140, and displaying that battery charging has been completed on a display unit and turning off an output current of the charger, if the battery charging has been completed, step S150.

The operation of the conventional art battery charging method for a mobile communication will now be described in more detail.

In order to charge a battery attached to a mobile communication terminal, the battery is mounted in a charge slot provided in the charger. Then, the charger checks the ID terminal of the battery to determine the battery capacity, step S110. That is, the charger determines the battery capacity from a resistance value of the ID terminal of the battery. For example, if an ID resistance value of a battery having a capacity of 500 mAh is 2.4 KW and an ID resistance value of a battery having a capacity of 750 mAh is 4.7 KW, the charger can determine a capacity of the battery to be charged from the resistance value of the ID terminal.

After the charger determines the battery capacity, it applies a charge current corresponding to the battery capacity to the charge terminal of the battery, step S120. For example, if the battery capacity is 500 mAh, the charger applies a 500 mAh charge current, or if the battery capacity is 750 mAh, the charger applies a 750 mAh charge current.

After the charge current is applied, a charge voltage of the battery or an output current value of the charger is measured, step S130. If the measured battery charge voltage exceeds a predetermined voltage, a value of the current output from the charger is gradually reduced. For example, if the charger initially outputs a current of 500 mAh and if the battery charge voltage exceeds the predetermined voltage, the charger outputs a current value smaller than 500 mAh and then the value is reduced gradually.

Accordingly, if the battery charge voltage is greater than the pre-set reference voltage or if the charge current output from the charger is smaller than the pre-set reference current, it is determined that the battery charging has been completed, step S140. Then, a charging completion message is displayed on a display unit, and the current output from the charger is turned off, step S150.

While the battery of the mobile communication terminal is being charged, a message is displayed indicating that the battery is being charged and the mobile communication terminal may perform certain operations at the same time, providing convenience for a user. For example, in order to display the fact that the battery is being charged at the mobile communication terminal, a liquid crystal screen backlight and a keypad backlight of the terminal are operated. In other words, a battery bar displayed on the liquid crystal screen is scrolled or characters such as 'battery charging' are output, so that the user is aware of the processes being performed by viewing the liquid crystal screen of the mobile communication terminal. In addition, the user can instruct the mobile communication terminal to perform certain operations during the battery charging, such as searching a previously stored number by depressing a key button on the mobile communication terminal, or performing a menu manipulation in order to change a setting of the mobile communication terminal.

However, during operation of the backlight of the liquid screen display and keypad and during mobile communication terminal manipulation by the user, the mobile communication terminal consumes a current supplied from the charger. That is, the charger performs the battery charging by outputting only a pre-set current value corresponding to the battery capacity, which does not take into account the amount of current consumed by the mobile communication terminal. Therefore, if the current consumption of the mobile communication terminal increases, the amount of current charged to the battery is reduced, resulting in a problem that the time taken to complete the battery charging increases.

SUMMARY OF THE INVENTION

An object of the invention is to solve at least the above problems and/or disadvantages and to provide at least the advantages described hereinafter.

In order to achieve at least the above objects, in whole or in part, and in accordance with the purpose of the invention, as embodied and broadly described, a method according to an embodiment of the invention is provided that includes detecting a value of current flowing to a communication terminal when a battery of the communication terminal is being charged by a charging device, outputting a data signal from the communication terminal corresponding to the detected current value, and adding a compensation current to a current input to the battery based on the detected current value.

To further achieve at least the above objects, in whole or in part, and in accordance with the purpose of the invention, as embodied and broadly described, a charging system for a communication terminal according to an embodiment of the invention is provided that includes a constant voltage/constant current output unit configured to output a constant voltage/constant current for charging a battery of a communication terminal; a current sensor unit configured to detect a value of current flowing from the constant voltage/constant current output unit to the communication terminal, a modem unit configured to receive the detected current value and output a data signal corresponding to the detected current value, and a controller configured to receive the data signal and output a control signal to the constant voltage/constant current output unit to supply the battery a compensation current equivalent to a value of the current flowing to the communication terminal.

To further achieve at least the above objects, in whole or in part, and in accordance with the purpose of the invention, as embodied and broadly described, a charging method for a battery attached to a communication terminal according to an embodiment of the invention is provided that includes supplying a current to a battery attached to a communication terminal to charge the battery, detecting an amount of current diverted to the communication terminal during charging of the battery, and increasing the current supplied to the battery based on the detected amount of current diverted to the communication.

To further achieve at least the above objects, in whole or in part, and in accordance with the purpose of the invention, as embodied and broadly described, a charging device for a battery attached to a communication device according to an embodiment of the invention is provided that includes a constant voltage/constant current output unit configured to supply a current to a battery attached to a communication device to charge the battery, and a controller configured to output a control signal to the constant voltage/constant current output unit to add a compensation current to the current supplied to the battery in response to a data signal received from the communication terminal, the data signal corresponding to a detected amount of current being diverted to the communication terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The invention is discussed below referring, as an example, to a mobile communication terminal. However, the invention may be utilized with other types of communication devices that require charging.

The charging system and method for charging a communication terminal according to embodiments of the invention supply a constant current to a battery, regardless of whether the communication terminal is operated or not, by supplying to the battery a compensation current equivalent to a current input to the communication terminal. The invention will now be described with reference to accompanying drawings.

Figure 1:
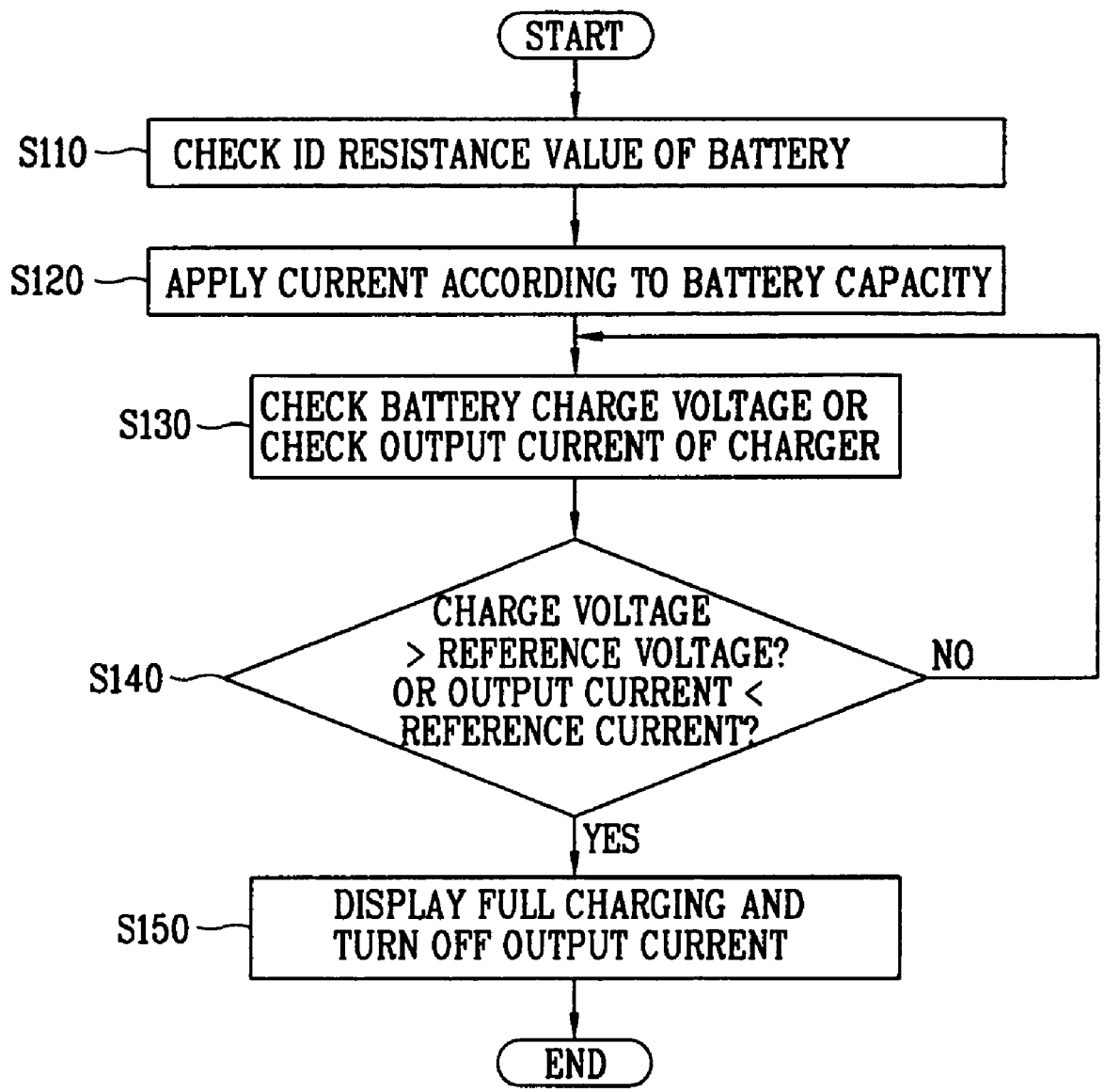
FIG. 1 is a flow chart of a conventional art battery charging method for a mobile communication terminal.
Figure 2:
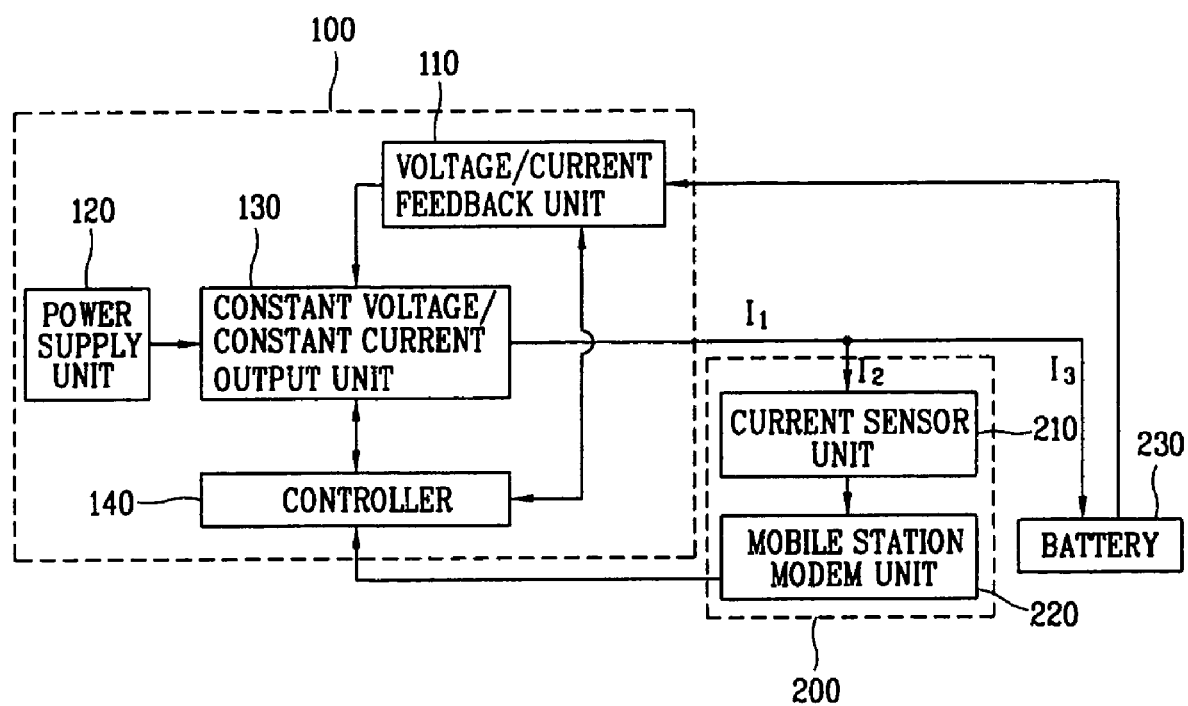
FIG. 2 is a schematic block diagram of a charging system for a mobile communication terminal according to an embodiment of the invention.

FIG. 2 is a schematic block diagram of a charging system for a mobile communication terminal according to an embodiment of the invention. The charging system 1 of FIG. 2 includes a battery 230, a mobile communication terminal 200 connected to the battery 230, and a charger 100.

The charger 100 includes a power supply unit 120 configured to receive an external power and output a DC power, a constant voltage/constant current output unit 130 configured to receive the DC power and output a constant voltage/constant current for battery charging, a voltage/current feedback unit 110 configured to receive a portion of a current flowing to the battery and control a feedback resistance value for the input current value, and a controller 140 configured to control the constant voltage/constant current output unit and the voltage/current feedback unit.

The mobile communication terminal 200 includes a current sensor unit 210 configured to detect a current flowing into the mobile communication terminal from the constant voltage/constant current output unit 130, and a mobile station modem (MSM) unit 220 configured to receive the current value detected from the current sensor unit 210 and output a data signal to supply a compensation current to the controller 140 according to the detected current value.

The charger also includes a port that transmits certain data from the mobile station modem unit 220 to the controller 140.

The operation of the charging system for the mobile communication terminal in accordance with an embodiment of the invention will now be described with reference to two example cases, a first exemplary case in which a small amount of current is input to the mobile communication terminal 200 and a second exemplary case in which a large amount of current is input to the mobile communication terminal 200.

In the first exemplary case, if a current value detected by the current sensor unit 210 of the mobile communication terminal 200 is smaller than a pre-set reference current value, that is, if, for example, an infinitesimal current flows to the mobile communication terminal 200, the mobile station modem unit 220 determines that the current input to the mobile communication terminal 200 will not affect the time needed to charge the battery 230, and will output a predetermined data signal for '0'. For example, if a data signal received by the mobile station modem unit 220 is 8 bits, it outputs a signal having a value of '00000000'. The predetermined data signal '0' means that the output current of the charger 100 does not need to be adjusted. That is, when a predetermined current $I_1$ is output from the charger 100, the output current $I_1$ is input to the battery 230 and the terminal 200 as currents $I_2$ and $I_3$. The current sensor unit 210 detects the amount of current $I_2$ input to the mobile communication terminal 200, step S230, and outputs the detected current value to the mobile station modem unit 220. The remaining current $I_3$, the current obtained from $I_1$-$I_2$, is charged to the battery 230.

Generally, the amount of current input to the mobile communication terminal 200 is small, and the current charged to the battery 230 is almost the same as the current output from the charger 100. For example, if a current $I_1$ output from the charger 100 is 500 mA, and a current $I_2$ input to the mobile communication terminal 200 is about 3 mA, the remaining current $I_3$, 497 mA, is charged to the battery 230.

Thus, the mobile station modem unit 220 receives the current value output from the current sensor unit 210. When the current value is determined to be lower than a pre-set current value, the mobile station modem unit 220 outputs a data signal for '0' to the controller 140 of the charger 100 through a terminal provided at the battery 230 or the mobile communication terminal 200, step S240.

Accordingly, the controller 140 of the charger 100 receives the data signal output from the mobile station modem unit 220, processes it, and controls the constant voltage/constant current output unit 130, step S250. Since the current value required by the data signal is "0", it does not affect the output current, so the initial output current is output as is. For example, if an initial current is 500 mA, the current value 500 mA is output. Also, the battery 230 connected to the mobile communication terminal 200 is charged with the output current, for example, 500 mA, step S260.

In the second exemplary case, if the current value detected by the current sensor unit 210 of the mobile communication terminal 200 is greater than the pre-set reference current value, the mobile station modem unit 220 determines that the current input to the mobile communication terminal 200 will affect the time to charge the battery 230, and outputs a predetermined data signal for the current value to the charger 100. That is, when a predetermined current $I_1$ is output from the charger 100, again the current $I_1$ is input to the battery 230 and the mobile communication terminal 200 as currents $I_2$ and $I_3$. At this time, the current sensor unit 210 detects the amount of current $I_2$ input to the mobile communication terminal 200, step S230, and outputs the detected current value to the mobile station modem unit 220. The remaining current $I_3$, the current obtained from $I_1$-$I_2$, is charged to the battery 230. For example, if a current $I_1$ output from the charger 100 is 500 mA and a current $I_2$ input to the mobile communication terminal 200 for, for example, a backlight and a temperature compensated crystal oscillator (TCXO) in the mobile communication terminal 200, is 250 mA, the battery 230 is only charged with the remaining current $I_3$, obtained from $I_1$-$I_2$, of the input current, or 250 mA.

Further, the mobile station modem unit 220 receives the current value, for example, 250 mA, output from the current sensor unit 210 and determines that the current value is greater than the pre-set current value. Then, the mobile station modem unit 220 outputs a predetermined data signal for the current value to the controller 140 of the charger 100 through a terminal provided at the battery 230 or the mobile communication terminal 200, step S240.

Thereafter, the controller 140 of the charger 100 receives the data signal output from the mobile station modem unit 220 and controls the constant voltage/constant current output unit 130. Thus, the controller 140 can output a current obtained by adding a current value corresponding to the data signal to the initial output current value, step S250. For example, if the initial output current value $I_1$ is 500 mA and the current value included in the data signal $I_2$ is 250 mA, then the current value output from the constant voltage/constant current output unit 130, which the controller 140 controls, would be 750 mA, equal to $I_1$+$I_2$.

When the current $I_1$+$I_2$, in this example 750 mA, is output from the charger 100 after being adjusted, a predetermined current, 250 mA in this example, out of the output current of $I_1$+$I_2$, 750 mA in this example, is input to the mobile communication terminal 200 to perform a certain operation, while the remaining current $I_3$, 500 mA in this example, is input to charge the battery 230, step S260. Transmission of the predetermined data signal from the mobile station modem unit 220 to the controller 140 of the charger 100 is made by the mobile station modem unit 220 for a pre-set time, and the current output from the charger 100 is controlled accordingly.

Figure 3:
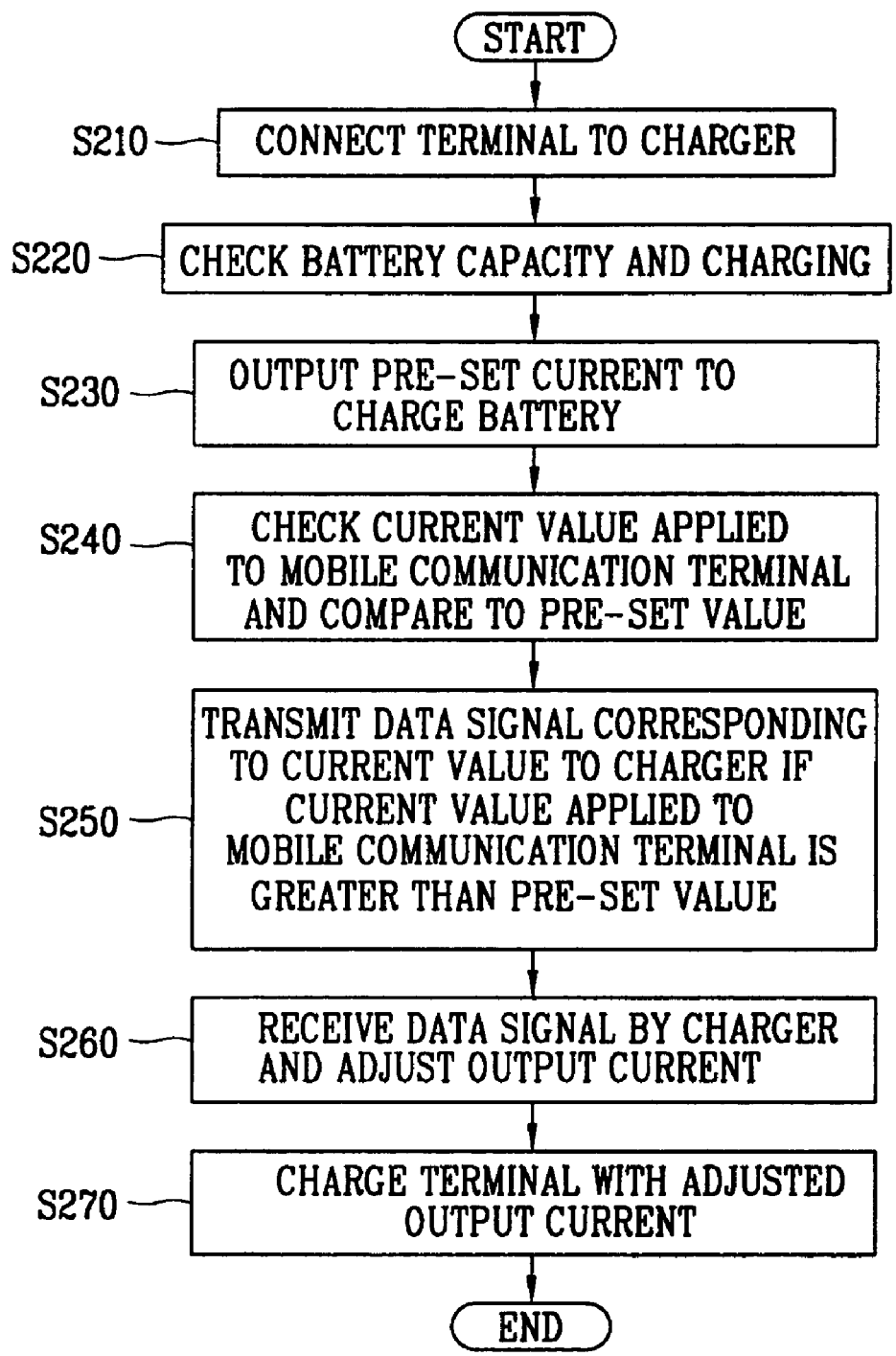
FIG. 3 is a flow chart of a method for charging a mobile communication terminal according to an embodiment of the invention.

FIG. 3 is a flow chart of a charging method for a mobile communication terminal according to an embodiment of the invention. Referring to FIG. 3, in the charging method for a mobile communication terminal, first, the battery 230, which is connected to the mobile communication terminal 200, and the charger 100 are connected, step S210, and a capacity of the battery 230 is determined, step S220. The capacity of the battery 230 can be measured from a resistance value of a terminal of the battery 230, for example, the ID terminal. The resistance value used to verify the capacity of the battery 230 is determined by the mobile communication provider.

A pre-set current is output according to the battery capacity to charge the battery of the mobile communication terminal, step S230. For example, if the battery capacity is 500 mA, 500 mA of current is output, and if the battery capacity is 750 mA, 750 mA of current is output.

Thereafter, a value of a current flowing into the mobile communication terminal is detected and the detected current value is compared to the pre-set current, step S240. That is, it is checked whether the amount of current flowing to the terminal 200 is greater than the pre-set current. If the detected current value is greater than the pre-set current, the mobile station modem unit 220 of the terminal 200 outputs a data signal corresponding to the detected current value to the controller 140, step S250.

Finally, the charger 100 receives the data signal and adds a compensation current $I_2$ corresponding to the input data signal to the current $I_3$ input to the battery, step S260, and supplies it to the battery 230, step S270. Accordingly, the battery 230 is supplied with a constant charge current $I_2$+$I_3$ regardless of the operation of the mobile communication terminal.

The supplying of a compensation current by the charger to the mobile communication terminal may be performed by the following methods according to embodiments of the invention.

According to one embodiment, the current output from the constant voltage/constant current output unit 130 may be increased by controlling a set voltage value of the controller 140 of the charger 100 corresponding to the current value flowing to the mobile communication terminal 200. In more detail, the mobile station modem unit 220 receives a current value detected by the current sensor unit 210 of the mobile communication terminal 200 and outputs a data signal according to the detected current value to the controller 140 of the charger 100. The controller 140 receives the data signal and controls the voltage output by the constant voltage/constant current output unit 130 using, for example, a microcomputer provided at the controller 140, that is, the controller 140 outputs a corresponding pulse voltage signal to control the constant voltage/constant current output unit 130. Then, based on the pulse voltage signal received from the controller 140, the constant voltage/constant current output unit 130 outputs a voltage, to supply a compensation current.

According to another embodiment, the current output from the charger 100 can be increased by reducing a feedback resistance of the voltage/current feedback unit 110 according to a value of the current flowing to the mobile communication terminal 200. In more detail, the mobile station modem unit 220 receives a current value detected by the current sensor unit 210 of the mobile communication terminal 200 and outputs a data signal corresponding to the detected current value to the controller 140 of the charger 100. The controller 140 receives the data signal provided from the mobile communication terminal 200, outputs a signal to reduce a feedback resistance of the voltage/current feedback unit 110, and outputs a pulse voltage signal to control the constant voltage/constant current output unit 130. Then, based on the pulse voltage signal received from the controller 140, the constant voltage/constant current output unit 130 outputs a voltage, to supply a compensation current.

The charging system and method for charging a communication terminal according to embodiments of the invention have at least the following advantages.

The invention provides a charging system and method for charging a communication terminal capable of supplying a constant current to a battery being charged, regardless of whether the communication terminal is operated or not, by supplying a compensation current to the battery equivalent to an amount of current input to the communication terminal.

For example, the amount of the current input to the communication terminal, for example, to perform certain operations is determined, and then, the same amount of the current consumed by the communication terminal is compensated when charging the battery. Therefore, a constant current can be input to the battery regardless of the operation of the communication terminal, and as a result, the time to complete charging the battery can be reduced.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A charging method for a communication terminal, comprising:
   detecting a value of current flowing to a communication terminal when a battery of the communication terminal is being charged by a charging device;
   outputting a data signal from the communication terminal to the charging device corresponding to the detected current value; and
   adding a compensation current to a current input to the battery by the charging device based on the detected current value, the compensation current substantially equaling an amount of current flowing to the communication terminal during charging of the battery.

2. The method of claim 1, further comprising:
   charging the battery by connecting the communication terminal to the charging device.

3. The method of claim 2, wherein charging the battery comprises:
   determining a capacity of the battery; and
   outputting a pre-set current according to the battery capacity to charge the battery.

4. The method of claim 1, wherein adding a compensation current to a current input to the battery by the charging device based on the detected current value comprises controlling a set voltage value of the charging device corresponding to the detected current value.

5. The method of claim 4, wherein controlling a set voltage value of the charging device corresponding to the detected current value comprises:
   receiving the data signal at a controller of the charging device and outputting a pulse voltage to control a constant voltage/constant current output circuit of the charging device; and
   receiving the output pulse voltage at the constant voltage/constant current output circuit and outputting the compensation current.

6. The method of claim 1, wherein adding a compensation current to a current input to the battery based on the detected current value comprises controlling a feedback resistance of the charging device corresponding to the detected current value.

7. The method of claim 6, wherein controlling a feedback resistance of the charging device corresponding to the detected current value comprises:
   receiving the data signal at a controller of the charging device, outputting a signal for reducing a feedback resistance of the charging device corresponding to the input data signal, and outputting a pulse voltage signal to control a constant voltage/constant current output circuit of the charging device;
   receiving the feedback resistance reduction signal at a voltage/current feedback resistance circuit of the charging device and reducing a feedback resistance of the charging device; and
   receiving the output pulse voltage signal at the constant voltage/constant current output circuit and outputting the compensation current.

8. The method of claim 1, wherein the communication terminal is a mobile communication terminal.

9. A charging method for a battery attached to a communication terminal, comprising:
   supplying a current to a battery attached to a communication terminal to charge the battery;
   detecting an amount of current diverted to the communication terminal during charging of the battery;

determining that the amount of diverted current exceeds a reference value set to correspond to an excessive charging time;

generating a data signal indicative of the amount the diverted current; and increasing the current supplied to the battery based on the detected amount of current diverted to the communication terminal as determined by the data signal.

10. The charging method of claim 9, wherein increasing the current supplied to the battery based on the detected amount of current diverted to the communication terminal comprises increasing the current supplied to the battery based on the detected amount of current diverted to the communication terminal if the detected amount is greater than a predetermined amount.

11. The charging method of claim 9, wherein supplying a current to a battery attached to a communication terminal to charge the battery comprises:

determining a capacity of the battery; and supplying an amount of current to the battery based on the battery capacity.

12. The charging method of claim 9, wherein increasing a current supplied to the battery based on the detected amount of current diverted to the communication terminal comprises: controlling a voltage supplied by a charging device to the battery corresponding to the detected amount of current diverted to the communication terminal.

13. The charging method of claim 9, wherein increasing a current supplied to the battery based on the detected amount of current diverted to the communication terminal compromises:

controlling a feedback resistance of a charging device charging the battery corresponding to the detected amount of current diverted to the communication terminal.

14. The charging method for claim 9, wherein the communication terminal is a mobile communication terminal.

15. A charging device for a battery attached to a communication device, the charging device comprising:

a constant voltage/constant current output circuit configured to supply a current to a battery attached to a communication device to charge the battery;

a controller configured to output a control signal to the constant voltage/constant current output circuit to add a compensation current to the current supplied to the battery in response to a data signal received from the communication terminal, the data signal corresponding to a detected amount of current being diverted to the communication terminal and the compensation current substantially equaling an amount of current flowing to the communication device during charging of the battery.

16. The charging device of claim 15, further comprising:

a power supply circuit configured to receive external power and output DC power to the constant voltage/constant current output circuit.

17. The charger device of claim 15, further comprising:

a voltage/current feedback circuit configured to control a feedback resistance value of the current supplied to the battery.

18. The charging method of claim 1, wherein the data signal provides an indication of an amount of compensation current required to maintain a substantially constant charging current to the battery irrespective of variations in load requirements of the communication terminal.

19. The method of claim 1, wherein the amount of compensation current indicated by the data signal substantially corresponds to an amount of current consumed by an operation performed by the communications terminal during charging.

20. The method of claim 19, wherein said operation is powering an oscillator for placing a call.

21. The method of claim 19, wherein said operation is related to viewing information on a display of the communication terminal.

22. The method of claim 1, wherein the data signal includes a binary value indicative of the amount of compensation current required to maintain said substantially constant charging current to the battery.

23. The charging method of claim 9, wherein the current supplied to the battery is increased to maintain a substantially constant charging current to the battery irrespective of a variation in load requirements of the communications terminal.

24. The method of claim 1, further comprising:

comparing the detected current value to a pre-set value; and outputting the data signal having a first value if the detected current value is below the pre-set value and outputting the data signal having a second value if the detected current value is above the pre-set value, wherein the compensation current is added to a current input to the battery if the data signal has said second value and wherein no compensation current is added when the data signal has said first value.

25. The method of claim 24, wherein the pre-set value corresponds to a negligible amount of current flowing to the communication terminal.

26. The method of claim 25, wherein adding the compensation current includes: changing a feedback resistance of a voltage/current feedback circuit in the charging device in response to the data signal having said second value.

27. The method of claim 25, wherein the compensation current is added to maintain a predetermined charge time which is at least substantially equal to a time required to charge the terminal when no operation other than battery charging is being performed by the terminal.

28. The method of claim 27, wherein the communication terminal is a mobile phone handset.

* * * * *